(12) United States Patent
Chavan et al.

(10) Patent No.: US 11,755,402 B1
(45) Date of Patent: Sep. 12, 2023

(54) SELF-HEALING INFORMATION TECHNOLOGY (IT) TESTING COMPUTER SYSTEM LEVERAGING PREDICTIVE METHOD OF ROOT CAUSE ANALYSIS

(71) Applicant: Sprint Communications Company L.P., Overland Park, KS (US)

(72) Inventors: Raju Chavan, Overland Park, KS (US); Aaron R. Haehn, Olathe, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 160 days.

(21) Appl. No.: 17/164,806

(22) Filed: Feb. 1, 2021

(51) Int. Cl.
*G06F 11/00* (2006.01)
*G06F 11/07* (2006.01)
*G06F 11/36* (2006.01)
*G06N 20/00* (2019.01)

(52) U.S. Cl.
CPC ........ *G06F 11/079* (2013.01); *G06F 11/3664* (2013.01); *G06F 11/3684* (2013.01); *G06F 11/3688* (2013.01); *G06N 20/00* (2019.01)

(58) Field of Classification Search
CPC ............... G06F 11/079; G06F 11/3664; G06F 11/3684; G06F 11/3688; G06N 20/00
See application file for complete search history.

(56) References Cited

U.S. PATENT DOCUMENTS

| | | | | |
|---|---|---|---|---|
| 6,012,152 A * | 1/2000 | Douik | ................. | G06F 11/0709 714/E11.027 |
| 9,069,737 B1 * | 6/2015 | Kimotho | ............. | G06F 11/0709 |
| 10,810,076 B1 * | 10/2020 | Spiro | ..................... | G06F 11/079 |
| 2009/0094484 A1 * | 4/2009 | Son | ........................ | G06F 11/079 714/26 |
| 2009/0182794 A1 * | 7/2009 | Sekiguchi | ........... | G06F 11/0775 714/39 |
| 2015/0242262 A1 * | 8/2015 | Ranganathan | ........ | G06F 11/008 714/37 |
| 2017/0102989 A1 * | 4/2017 | Kotikalapudi | .......... | H04L 67/34 |
| 2018/0101464 A1 * | 4/2018 | Fan | ...................... | G06F 11/3604 |
| 2019/0079818 A1 * | 3/2019 | Handa | ................. | G06F 11/0778 |
| 2020/0202007 A1 * | 6/2020 | Nagaraja | ................... | G06F 8/71 |
| 2020/0327005 A1 * | 10/2020 | Singh | .................. | G06F 11/0709 |
| 2020/0327008 A1 * | 10/2020 | Singh | .................. | G06K 9/6201 |
| 2022/0019496 A1 * | 1/2022 | Lozano | ............... | G06K 9/6256 |
| 2022/0138032 A1 * | 5/2022 | Li | ....................... | G06F 11/0772 714/37 |

* cited by examiner

*Primary Examiner* — Joshua P Lottich

(57) ABSTRACT

A method of performing root cause analysis of communication system testing results and submitting communication system defect tickets along with associated previously resolved communication system defect tickets that provide insights for repairing the communication system defects. The method comprises categorizing by a categorization engine error messages in logs received from applications undergoing test, remediating the test data errors and rerunning a test case by a test data error handling script, for each error message categorized as a valid error, searching a data store by a valid error handling script to identify previously resolved defect tickets that match the valid error, and, for each error message categorized as a valid error, generating a defect ticket by the valid error handling script that describes the error message categorized as a valid error and identifies at least some of the previously resolved defect tickets that match the valid error.

20 Claims, 5 Drawing Sheets

SELF-HEALING INFORMATION TECHNOLOGY (IT) TESTING COMPUTER SYSTEM LEVERAGING PREDICTIVE METHOD OF ROOT CAUSE ANALYSIS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Communication systems are implemented by hardware executing computer programs or applications. These applications desirably are tested thoroughly before installing the applications into a live communication system carrying user traffic. This testing may be conducted in a test environment that at least partly resembles the hardware resources of a production environment that carries live traffic. The process of testing communication applications can be both complicated and expensive.

SUMMARY

In an embodiment, a method of performing root cause analysis of communication system testing results, submitting communication system defect tickets along with associated previously resolved communication system defect tickets that provide insights for repairing the communication system defects, and analyzing previously resolved communication system defect tickets to update a machine learning test error categorization engine is disclosed. The method comprises receiving logs from communication system applications undergoing test by a machine learning test error categorization engine executing on a computer system and categorizing a plurality of error messages in the logs received from the communication system applications by the machine learning test error categorization engine based on a plurality of pre-defined categorization rules, wherein each of the plurality of error messages is categorized as a test data error, a test environment error, a test case error, or a valid error. The method further comprises, for each error message categorized as a test data error by the machine learning test error categorization engine, automatically remediating the test data error and rerunning a test case that generated the error message by a test data error handling script executing on the computer system. The method further comprises, for each error message categorized as a test environment error by the machine learning test error categorization engine, accessing a test environment monitoring system by a test environment error handling script executing on the computer system to determine if a test environment outage associated with the error message categorized as a test environment error by the machine learning test error categorization engine has been reported, if a test environment outage associated with the error message categorized as a test environment error by the machine learning test error categorization engine has not been reported, sending a notification about the outage associated with the test environment by the test environment error handling script, and if a test environment outage associated with the error message categorized as a test environment error by the machine learning test error categorization engine has been reported, sending a notification to a tester about the reported test environment outage by the test environment error handling script. The method further comprises, for each error message categorized as a test case error by the machine learning test error categorization engine, searching a communication system defect ticket data store by a test case error handling script executing on the computer system to identify previously resolved communication system defect tickets that match the test case error and, for each error message categorized as a test case error by the machine learning test error categorization engine, sending a notification to a tester by the test case error handling script indicating the error message was categorized as a test case error and identifying the previously resolved communication system defect tickets found to match the test case error. The method further comprises, for each error message categorized as a valid error by the machine learning test error categorization engine, searching the communication system defect ticket data store by a valid error handling script executing on the computer system to identify previously resolved communication system defect tickets that match the valid error and, for each error message categorized as a valid error by the machine learning test error categorization engine, generating a communication system defect ticket by the valid error handling script that describes the error message categorized as a valid error by the machine learning test error categorization engine and identifies at least some of the previously resolved communication system defect tickets that match the valid error. The method further comprises analyzing the previously resolved communication system defects by the machine learning test error categorization engine, synthesizing new categorization rules by the machine learning test error categorization engine based on analyzing the previously resolved communication system defects, and adding the new categorization rules to the plurality of pre-defined categorization rules.

In another embodiment, a system to perform root cause analysis of communication system testing results and to automatically submit communication system defect tickets along with associated previously resolved communication system defect tickets that provide insights for repairing the communication system defects is disclosed. The system comprises a processor, a data store comprising a plurality of resolved communication system defect tickets, a non-transitory memory, a machine learning test error categorization engine stored in the non-transitory memory, a test data error handling script stored in the non-transitory memory, a test environment error handling script stored in the non-transitory memory, and a valid error handling script stored in the non-transitory memory. When executed by the processor, the machine learning test error categorization engine receives logs from communication system applications undergoing test and categorizes a plurality of error messages in the logs based on a plurality of pre-defined categorization rules. When executed by the processor, the test data error handling script, for each error message categorized by the machine learning test error categorization engine as a test data error, automatically remediates the test data error and reruns a test case that generated the error message. When executed by the processor, the test environment error handling script, for each error message categorized by the machine learning test error categorization engine as a test environment error, accesses a test environment monitoring system to determine if a test environment outage associated with the error message categorized as a test environment error has been reported and sends a notification about the test environment outage if the test environment outage is determined to not be reported. When executed by the processor, the valid error handling script, for each error message categorized by the machine learning test error categorization engine as a valid error, searches the data store to identify previously resolved communication system defect tickets that match the valid error, and for each error message categorized as a valid error by the machine learning test error categorization engine, generating a communication system defect ticket by the valid error handling script that describes the error message categorized as a valid error and identifies at least some of the previously resolved communication system defect tickets that match the valid error.

In yet another embodiment, a method of performing root cause analysis of communication system testing results and submitting communication system defect tickets along with associated previously resolved communication system defect tickets that provide insights for repairing the communication system defects is disclosed. The method comprises receiving logs from communication system applications undergoing test by a machine learning test error categorization engine executing on a computer system and categorizing a plurality of error messages in the logs received from the communication system applications by the machine learning test error categorization engine based on a plurality of pre-defined categorization rules. The method further comprises, for each error message categorized as a test data error by the machine learning test error categorization engine, automatically remediating the test data error and rerunning a test case that generated the error message by a test data error handling script executing on the computer system. The method further comprises, for each error message categorized as a test environment error by the machine learning test error categorization engine, accessing a test environment monitoring system by a test environment error handling script executing on the computer system to determine if a test environment outage associated with the error message categorized as a test environment error has been reported and, if a test environment outage is determined by the test environment error handling script not to be reported, sending a notification about the test environment outage by the test environment error handling script. The method further comprises, for each error message categorized as a valid error, searching the communication system defect ticket data store by a valid error handling script executing on the computer system to identify previously resolved communication system defect tickets that match the valid error and, for each error message categorized as a valid error, generating a communication system defect ticket by the valid error handling script that describes the error message categorized as a valid error and identifies at least some of the previously resolved communication system defect tickets that match the valid error.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
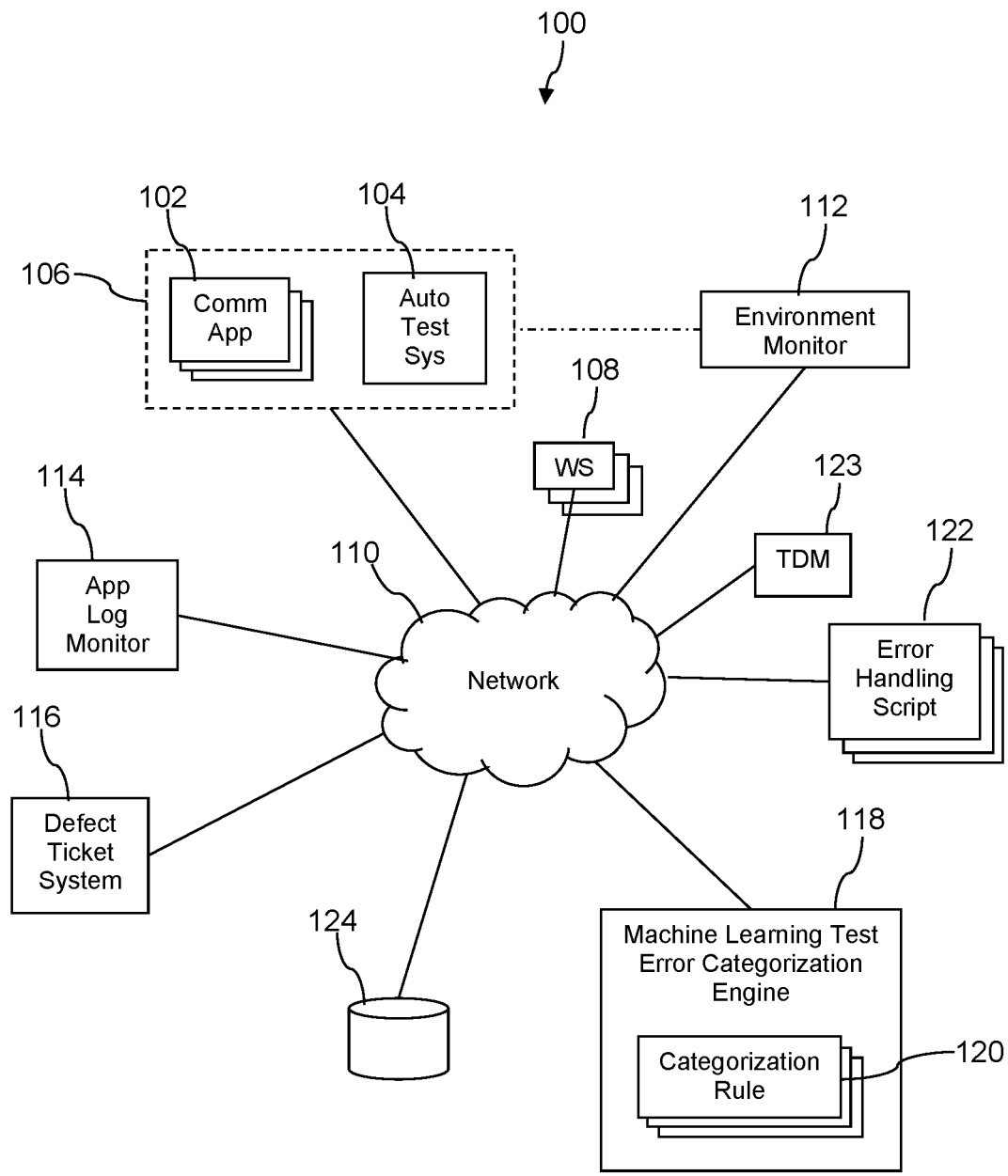
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system for testing applications executing on a computer system, automatically analyzing error reports generated by the testing, and automatically categorizing the reported errors as one of a test data error, a test environment error, a test case error, or a valid error. It is an insight of the present disclosure that an undesirably high fraction of defects reported by testing activities are not in fact defects of the applications under test but may be called false defects. Additionally, it is an insight of the present disclosure that many of the false defects exhibit patterns that can be detected by examining error reports and passed to alternative handling, thereby avoiding generating false defect tickets and avoiding wasting time of developers resolving the false defect tickets. This algorithmic association of error reports to cause categories based on pre-defined rules derived from those exhibited patterns may be referred to as predictive root cause analysis.

A conventional testing process includes testing an application with a test case; if the test case fails, the tester creates a defect ticket linked to the application and the failed test case; a developer is assigned to resolve the defect ticket; and the developer clears the defect ticket by releasing a fix to the application (e.g., a revision of the software that makes up the application). By categorizing the reported errors based on comparing information content in the error reports to a set of rules defining information patterns by a machine learning test error categorization engine, the testing process can be improved and false test negatives (false defect reports) can be avoided, thereby conserving valuable time of software developers who otherwise would be tasked with "fixing" software errors that are not in fact errors. Using root cause prediction to categorize the errors, the disclosed system in some cases can literally self-heal. In other cases, the disclosed system can more effectively route error reports to the persons or functional roles best suited for addressing each error report, thereby avoiding assignment of error reports to IT workers that are outside their expertise. Said in other words, the disclosure teaches a self-healing IT testing system and an improved error routing function of an IT testing system leveraging predictive root cause analysis. The disclosure describes at least one particular technical solution to a technical problem.

The system provides error reports to a machine learning test error categorization engine. The error categorization engine categorizes the error report as related to (1) a test data error, (2) a test environment error, (3) a test case error, or (4) a valid error. If the error categorization engine categorizes the error report as a test data error, it hands the error report off to a test data error handling script. Categorizing error reports in this way may be referred to as root cause prediction and/or root cause analysis in some contexts. The test data error handling script resolves the test data error and requeues the test case for execution with the correct data. If the error categorization engine categorizes the error report as a test environment error, it hands the error report off to a test environment error handling script. The test environment error handling script checks the test environment. If the test environment is found to be inoperable in some way, the test environment error handling script notifies the tester of this issue. The test environment error handling script further checks with a test environment monitor system to determine if the environment problem has been reported. If the environment problem has not been reported, the test environment error handling script sends notification of the environment problem to appropriate stake holders, for example to a system administrator or to an environment monitor dashboard application programming interface (API).

If the error categorization engine categorizes the error report as a test case error, it hands the error report off to a test case error handling script. The test case error handling script sends notification to the tester that the error report was probably caused by an erroneous test case. The tester then can further investigate the test case and resolve the error, for example by revising the definition of the expected outcome of the test case or possibly deleting the test case entirely from the suite of test cases. The test case error handling script also searches a data store of resolved defect tickets trying to find previously resolved defect tickets related to this test case. The test case error handling script will provide links to comparable resolved defect tickets that may help the tester resolve the erroneous test case issue. If the error categorization engine categorizes the error report as a valid error, it hands the error report off to a valid error handling script. The valid error handling script searches the data store of resolved defect tickets trying to find previously resolved defect tickets related to this test case. The valid error handling script opens a new defect ticket, attaches the error report to it, attaches links to comparable previously resolved defect tickets, and stores the defect ticket in a defect ticketing system.

The machine learning error categorization engine comprises a machine learning component that looks at specific fields of error reports and compares these fields to a database of previously resolved defect tickets. The error categorization engine is programmed or configured with error categorization rules that map previously learned patterns of error reports to one of the four categories identified above. The machine learning component of the machine learning error categorization engine can discover or learn new patterns in the resolved defect tickets and synthesize new error categorization rules based on that analysis. The machine learning component of the machine learning error categorization engine analyzes fields in the resolved defect tickets including ticket identity, summary of defect, application defect reported, finding and actions, closing category, submitted date and closing date, and history of comments. The machine learning component of the machine learning error categorization engine looks at fields in error reports including date, time, unique identity, cause of failure. When the machine learning component of the machine learning error categorization engine synthesizes a new error categorization rule it may add this rule to the other error categorization rules and begin using it. Alternatively, the machine learning error categorization engine may notify an administrator or developer of the synthesized new error categorization rule, the administrator or developer may evaluate the synthesized new error categorization rule, and if the rule is determined useful, the synthesized new error categorization rule may programmed into or configured into the machine learning error categorization engine.

Turning now to FIG. 1, a system 100 is described. In an embodiment, the system 100 comprises at least one communication application 102 being tested by an automated testing system 104 in a test environment 106. The test environment 106 comprises computers that the one or more applications 102 execute on as well as communication resources that the communication applications 102 may depend on, such as routers, domain name server (DNS) servers, service provisioning data bases, and the like. The automated test system 104 and the communication applications 102 may be controlled by one or more tester work stations 108. The test environment 106 and the work stations 108 may be communicatively coupled to a network 110. The network 110 comprises one or more public networks, one or more private networks, or a combination thereof. It is understood that while the applications under test described herein are described as communication applications, the teachings of the present disclosure may advantageously be used for testing other kinds of applications that are not communication applications.

In an embodiment, an environment monitor 112 may be communicatively coupled to the test environment 106 whereby to determine operational status of the computers and other communication hardware resources in the test environment 106. The environment monitor 112 may provide a dashboard that can be accessed by the work stations 108 and/or by other devices to determine the operational status of the environment 106 and to update operational status of the environment 106. Alternatively, the environment monitor 112 may not be communicatively coupled to the test environment 106 but is employed as a environment status tracking system that is maintained by administrators and developers.

As the applications 102 execute logs are generated by the applications 102 that are monitored by an application log monitor 114. The application log monitor 114 may specifically be filtering the log stream generated by the applications 102 for information content of special interest. When a log matching a filter criteria is found, the application log monitor 114 may generate an error report and send the error report to a machine learning test error categorization engine 118 via the network 110. In an embodiment, the machine learning test error categorization engine 118 is an application that executes on a computer system. Computer systems are described further hereinafter. The error report sent by the application log monitor 114 may identify a valid error of one of the applications 102 identified by executing a test case by the automated testing system 104 or the error report may comprise information that can be analyzed to determine that there is not a valid error in one of the applications 102 but rather that test data was faulty, the test environment 106 was not fully operational (e.g., at least part of the test environment 106 was suffering an outage), or the test case executed was faulty. In an embodiment, the application log monitor 114 comprises a Splunk tool that has been extended by defining filters based on the types of logs generated by the applications 102 and based on the information deemed to be indicative of failed test cases.

The machine learning test error categorization engine 118 analyzes the error report received from the application log monitor 114 based on a plurality of error categorization rules 120 that are predefined and/or pre-configured into the machine learning test error categorization engine 118 by an enterprise developing the applications 102, for example predefined and/or pre-configured by developers of a wireless communication service provider. The machine learning test error categorization engine 118 may categorize the error as (1) a test data error, (2) a test environment error, (3) a test case error, or (4) a valid error. This categorization activity may be referred to as predictive root cause analysis.

A test data error occurs when a test case fails because test data used in performing the test case was bad. This may happen because the appropriate test data was not loaded. Alternatively, this may happen when the appropriate test data was loaded but had previously been used. A test environment error occurs when the test environment 106 is not wholly operational. A test case error occurs when the test case defines the wrong result, the test case is performed, the right result occurs, but the test result is falsely deemed wrong because the wrong test result is defined by the test case. A valid error occurs when a test case fails and identifies a bona fide defect in the application 102 under test. After categorizing an error report, the machine learning test error categorization engine 118 launches one of a plurality of error handling scripts 122 and passes the error report to it to handle.

When an error report is categorized by the machine learning test error categorization engine 118 to be a test data error, the error categorization engine 118 launches a test data error handling script and passes the error report to it to handle. The test data error handling script executes on a computer system, for example the same computer system on which the error categorization engine 118 executes or on a different computer system. The test data error handling script analyzes the error report to determine if appropriate test data was loaded. If appropriate test data was not loaded, the test data error handling script causes the appropriate test data to be loaded and queues the test case up for re-running by the automated test system 104. If appropriate test data was loaded but the test data error handling script determines the test data had already been used, the test data error handling script retrieves data from a test data management (TDM) system 123 and queues the test case up for re-running using the test data retrieved from the TDM system 123. The test data error handling script may load test data into the automated test system 104. The correction of text data errors and queueing the test cases for re-running may be deemed self-healing, in the sense that an initially failed test case may automatically be rerun successfully, after automatically correcting the test data error, without human intervention.

When an error report is categorized by the machine learning test error categorization engine 118 to be a test environment error, the error categorization engine 118 launches a test environment error handling script (one among the error handling scripts 122) and passes the error report to it to handle. The test data environment error handling script executes on a computer system, for example the same computer system on which the machine learning test error categorization engine 118 executes or on a different computer system. The test environment error handling script first checks the test environment 106 to determine if the test environment 106 is fully operational. This checking of the test environment 106 may be performed based at least in part on the test case related to the error report. Said in other words, the check of the test environment 106 may be limited to checking the availability and status of communication resources engaged in the specific test case associated with the error report. For example, if the subject test case does not engage an email server, the check of the test environment 106 may not check the status of an email server in the test environment 106. For example, if the subject test case does not engage a DNS server, the check of the test environment 106 may not check the status of the DNS server in the test environment 106. By contrast, if these services are engaged by the test case, the check of the test environment 106 checks the status of the email server and the status of the DNS server in the test environment 106.

If the test environment 106 is determined to have an outage, the test environment error handling script checks the environment monitor 112 to determine if the outage is already reported. If the outage is not yet reported, the test environment error handling script access an application programming interface (API) of the environment monitor 112 to report the outage. Alternatively, if the outage is not yet reported, the test environment error handling script may send a notification, for example an email and/or a text message, to an administrator or other responsible party who will report the outage to the environment monitor 112. The test environment error handling script may monitor the status of the test environment 106, for example based on polling the environment monitor 112, and send a notification to the tester when the test environment 106 becomes operational again. Alternatively, the test environment error handling script may re-queue the test case for execution by the automated testing system 104 when the test environment 106 becomes operational again. This alternative that involves automated re-execution of the test case after the test environment 106 becomes operational again may be deemed self-healing, in the sense that an initially failed test case may automatically be rerun successfully without human intervention in the test case (workers may engage in resolving issues with the test environment 106).

When an error report is categorized by the machine learning test error categorization engine 118 to be a test case error, the categorization engine 118 launches a test case error handling script and passes the error report to it to handle. The test case error handling script executes on a computer system, for example the same computer system on which the error categorization engine 118 executes or on a different computer system. The test case error handling script searches a defect data store 124 to find closed defect tickets that are germane to the subject error report. The resolved defect tickets may comprise a plurality of fields. The resolved defect tickets may comprise a defect summary field, an application identity field (e.g., which identifies the application that was executing when the test case failed), a finding field, an action taken field, and a closing category field. In an embodiment, the defect data store 124 is periodically updated by the defect ticket system 116, for example storing copies of closed defect tickets that have been closed since the previous update provided to the defect data store 124. Defect tickets may be closed when the subject defect ticket has been resolved. Defect tickets may be resolved by rejecting them on the basis that the defect is in error (e.g., the test case associated with the defect ticket failed because of a test data error, a test environment error, or a test case error). Defect tickets may be resolved by determining a cause of a valid error, revising the subject application 102, and releasing an updated version of the subject application 102. The test case error handling script may attach some of the germane closed defect tickets or links to the germane closed defect tickets to a notification, along with a copy of the error report, and send the notification to the tester indicating the test case error. The tester has the action then of updating the test case to correct the error, for example by defining a different test result or for example deleting the test case entirely.

When an error report is categorized by the machine learning test error categorization engine 118 to be a valid error, the categorization engine 118 launches a valid error handling script and passes the error report to it to handle. The valid error handling script executes on a computer system, for example the same computer system on which the error categorization engine 118 executes or on a different computer system. The valid error handling script searches the defect data store 124 to find closed defect tickets that are germane to the subject error report. The valid error handling script creates a defect ticket that comprises the content of the error report and attaches some of the germane closed defect tickets or links to the germane closed defect tickets to the defect ticket and stores the defect ticket in the defect ticket system 116. Developers may be assigned action to resolve the defect tickets by the defect ticket system 116 or by managers.

In analyzing the error reports to categorize them, the machine learning test error categorization engine 118 may look at one or more fields or information of the error reports. For example, a log message that contains, among other information, a string 'TARGET_ERROR_DESC=Bad request—No Rule is found' may be associated with a test data error. For example, a log message that contains, among other information, a string 'not found in the Cache. Unable to process' may be associated with a valid error. The machine learning test error categorization engine 118 may look at other fields of the error report comprising an application under test identity field and a cause of failure field.

The error categorization engine 118 may parse a closed defect ticket to learn one more of a defect ticket identity, a date and time the defect ticket was created, a summary of the defect, an identify of a test case that was the basis of the creation of the defect ticket, an application 102 that was tested by the subject test case, a finding by a person assigned the action of resolving the defect ticket, an action taken to resolve the defect ticket, a defect closing category (e.g., closed because rejected, closed because fixed, or another close category), a date and time the defect ticket was closed, and a history of comments. The error categorization engine 118 may link information found in the error report to corresponding information in closed defect tickets to infer the categorization of the error report.

The machine learning test error categorization engine 118 executes the error categorization rules 120 against the information obtained from the error report to categorize the error report. It is understood that this categorization is a matter of determining a probable categorization. Said in other words, sometimes the error categorization engine 118 may categorize the error wrongly, in which case this will be discovered and worked out in time. For example, if the error report is improperly deemed a valid error and a defect ticket opened, the developer assigned the action of resolving the defect ticket will discover the erroneous categorization and work that issue out (e.g., reject the defect report and provide analysis and rationale for the rejection). For example, if a valid error is improperly categorized as a test data error or a test environment error, the test case is retried. If the test case fails again, the error report may be determined on this second go around by the error categorization engine 118 to be a valid error. For example, if a valid error is improperly categorized as a test case error, the tester who is assigned the action of fixing the test case error will determine that the test case is not wrong and this is in fact a valid error and create a defect ticket. But the system 100 described above, even with a success rate of less than 100%, can provide benefits by reducing the number of wrongly created defect tickets. The error categorization rules 120 define combinations of conditions or combinations of values in the different fields or components of the error reports. When an error categorization rule 120 is found that matches to the error report, the error categorization engine 118 assigns the category defined by that categorization rule 120 to the error report.

In an embodiment, the machine learning test error categorization engine 118 can analyze the closed defect tickets in the data store 124 to automatically identify patterns in the closed defect tickets and synthesize new error categorization rules 120 based on the analysis. In an embodiment, the error categorization engine 118 may analyze the closed defect tickets and synthesize new error categorization rules 120 periodically, for example once per week, once per quarter, or on some other interval. In an embodiment, the machine learning test error categorization engine 118 may simply advance such synthesized new error categorization rules 120 to be used to categorize error reports. Alternatively, the synthesized new error categorization rules 120 must first be reviewed by an administrator or developer responsible for maintaining the machine learning test error categorization engine 118, and upon deeming the synthesized error categorization rule 120 useful, the administrator or developer may manually introduce the new error categorization rule 120 into the machine learning test error categorization engine 118. In an embodiment, the synthesized new error categorization rules 120 may be executed in a shadow execution mode by the machine learning test error categorization engine 118, the results that could be obtained by using the synthesized new error categorization rules 120 determined based on comparing shadow use results to corresponding closed defect tickets, and if the synthesized new error categorization rules 120 are determined—through shadow execution—to provide benefit, then they are automatically promoted to live use in the machine learning test error categorization engine 118.

Figure 2A:
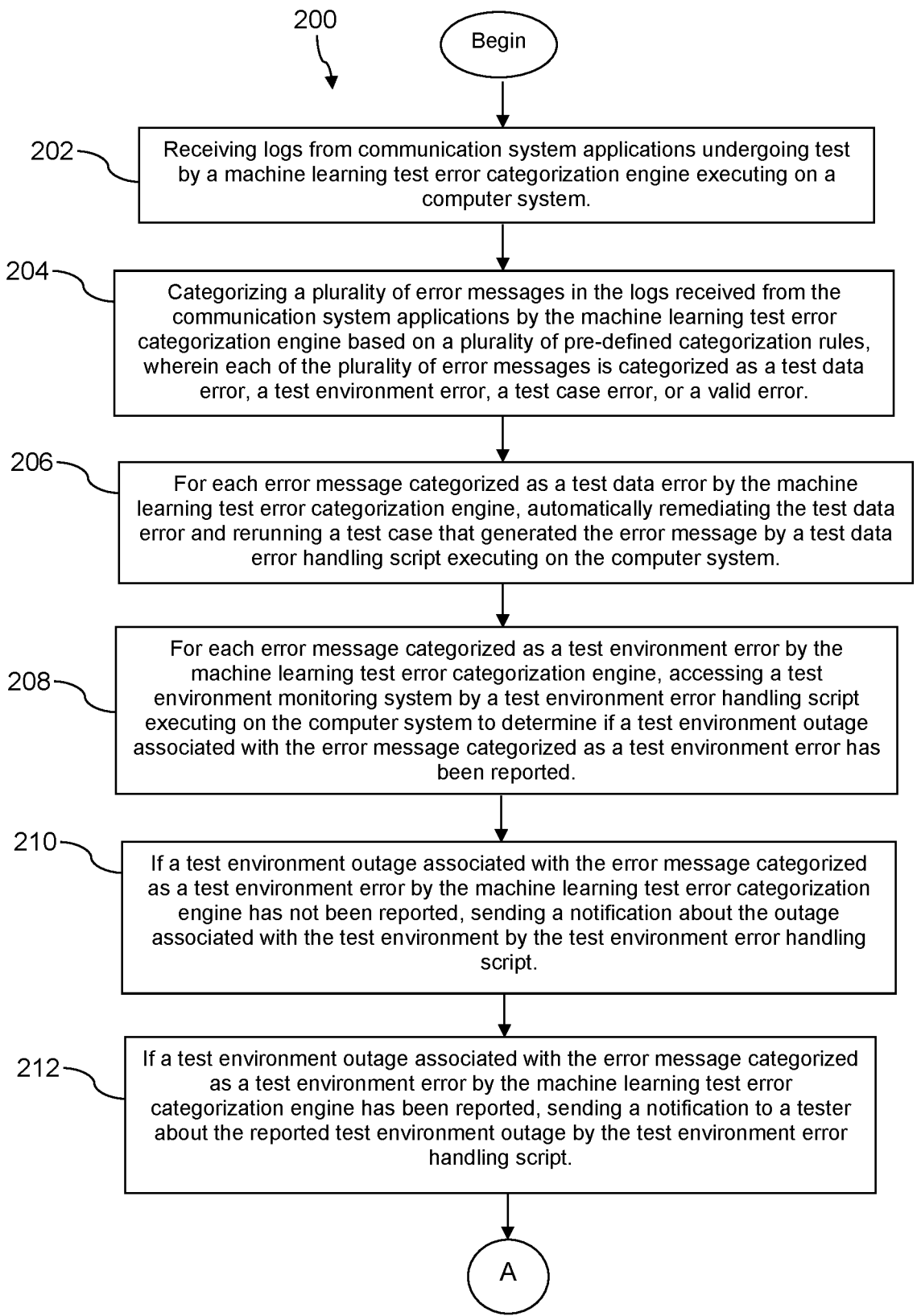
FIG. 2A and FIG. 2B are a flow chart of a method according to an embodiment of the disclosure.
Figure 2B:
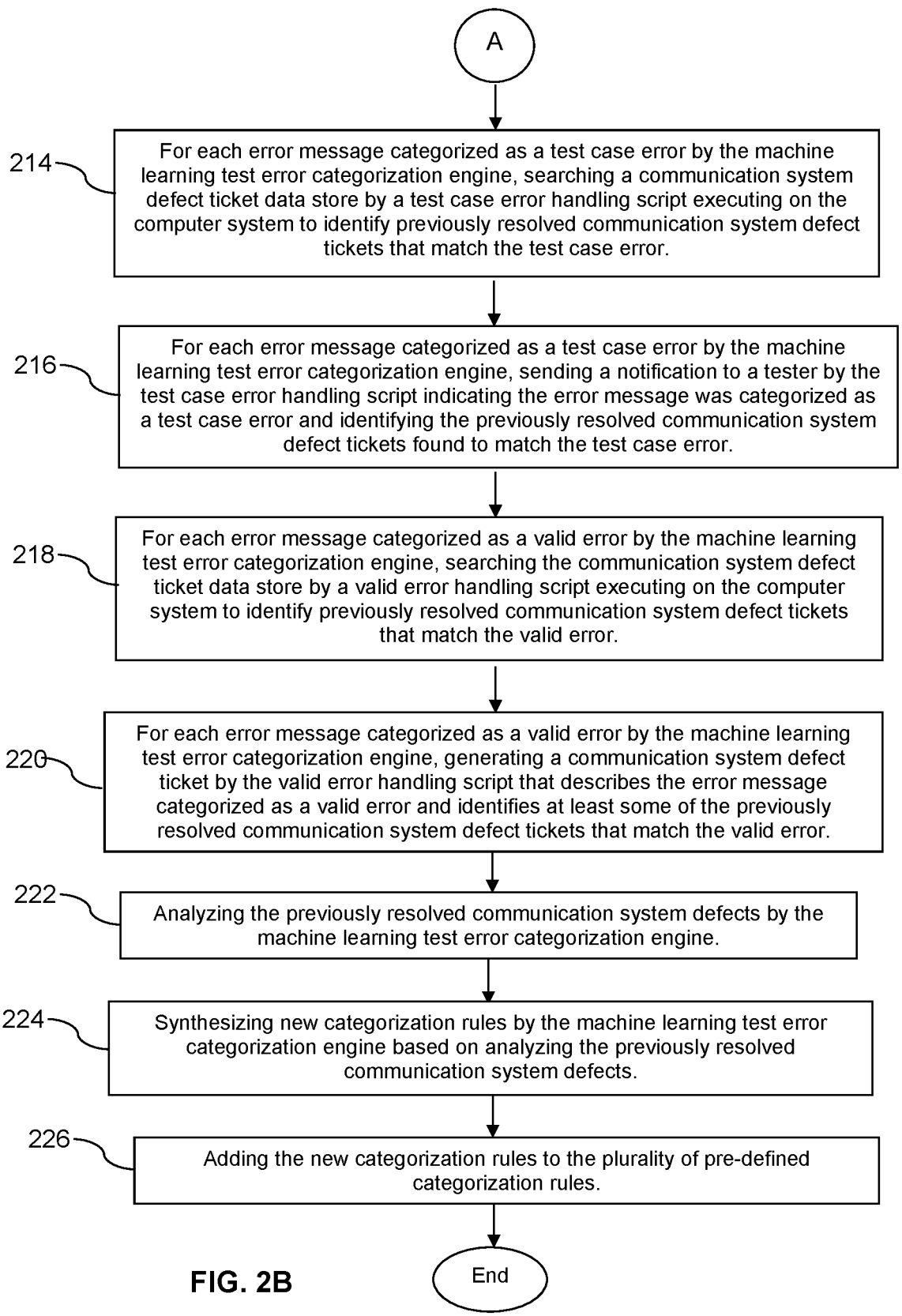

Turning now to FIG. 2A and FIG. 2B, a method 200 is described. In an embodiment, the method 200 is a method of performing root cause analysis of communication system testing results, submitting communication system defect tickets along with associated previously resolved communication system defect tickets that provide insights for repairing the communication system defects, and analyzing previously resolved communication system defect tickets to update a machine learning test error categorization engine. At block 202, the method 200 comprises receiving logs from communication system applications undergoing test by a machine learning test error categorization engine executing on a computer system. In an embodiment, the logs are received by the machine learning test error categorization engine 118 from the application log monitor 114 that receives the logs from the applications 102 undergoing test, in other words, the machine learning test error categorization engine 118 may receive the logs from the applications 102 indirectly via the application log monitor 114.

At block 204, the method 200 comprises categorizing a plurality of error messages in the logs received from the communication system applications by the machine learning test error categorization engine based on a plurality of pre-defined categorization rules, wherein each of the plurality of error messages is categorized as a test data error, a test environment error, a test case error, or a valid error. In another embodiment, the machine learning test error categorization engine may categorize the error messages into few than four different error categories or into more than four different error categories.

At block 206, the method 200 comprises, for each error message categorized as a test data error by the machine learning test error categorization engine, automatically remediating the test data error and rerunning a test case that generated the error message by a test data error handling script executing on the computer system. Remediating the test data error may comprise loading test data (e.g., loading the test data into the automated test system 104) when the test data error resulted from the appropriate test data not being loaded. Remediating the test data error may comprise determining that the test case used previously used test data, getting appropriate test data from a test data management (TDM) system 123, and loading the retrieved test data (e.g., loading the retrieved test data into the automated test system 104). The test case is rerun using the test data provided by the remediation. Rerunning the test case may comprise commanding the automated test system 104 to run the test case that failed.

At block 208, the method 200 comprises for each error message categorized as a test environment error by the machine learning test error categorization engine, accessing a test environment monitoring system by a test environment error handling script executing on the computer system to determine if a test environment outage associated with the error message categorized as a test environment error has been reported. At block 210, the method 200 comprises, if a test environment outage associated with the error message categorized as a test environment error by the machine learning test error categorization engine has not been reported, sending a notification about the outage associated with the test environment by the test environment error handling script. In an embodiment, the notification may be sent as an email or a text message to an administrator or a group address responsible for maintaining the test environment 106. In another embodiment, the notification may be provided via an application programming interface (API) of the environment monitor 112, such that a dashboard provided by the environment monitor 112 thereafter indicates the reported outage and/or sends notification to an administrator or group address. At block 212, the method 200 comprises, if a test environment outage associated with the error message categorized as a test environment error by the machine learning test error categorization engine has been reported, sending a notification to a tester about the reported test environment outage by the test environment error handling script. In an embodiment, the processing of test error handling script of block 210 and 212 may comprise determining when the test environment outage is resolved, and thereafter notifying a tester to rerun the subject test case, for example by sending notification (email or text message) to the tester.

At block 214, the method 200 comprises, for each error message categorized as a test case error by the machine learning test error categorization engine, searching a communication system defect ticket data store by a test case error handling script executing on the computer system to identify previously resolved communication system defect tickets that match the test case error. At block 216, the method 200 comprises, for each error message categorized as a test case error by the machine learning test error categorization engine, sending a notification to a tester by the test case error handling script indicating the error message was categorized as a test case error and identifying the previously resolved communication system defect tickets found to match the test case error.

At block 218, the method 200 comprises, for each error message categorized as a valid error by the machine learning test error categorization engine, searching the communication system defect ticket data store by a valid error handling script executing on the computer system to identify previously resolved communication system defect tickets that match the valid error. At block 220, the method 200 comprises, for each error message categorized as a valid error by the machine learning test error categorization engine, generating a communication system defect ticket by the valid error handling script that describes the error message categorized as a valid error and identifies at least some of the previously resolved communication system defect tickets that match the valid error. In an embodiment, the processing of block 220 comprises the valid error handling script submitting the defect ticket (and the identities of the related previously resolved defect tickets) to the defect ticket system 116, for example via an application programming interface (API) of the defect ticket system 116.

At block 222, the method 200 comprises analyzing the previously resolved communication system defects by the machine learning test error categorization engine. At block 224, the method 200 comprises synthesizing new categorization rules by the machine learning test error categorization engine based on analyzing the previously resolved communication system defects. At block 226, the method 200 comprises adding the new categorization rules to the plurality of pre-defined categorization rules. In an embodiment, the new categorization rules are added to the plurality of pre-defined categorization rules 120 automatically by the machine learning test error categorization engine 118. In an embodiment, the new categorization rules are evaluated by a developer and then added by the plurality of pre-defined categorization rules 120 manually by the developer or an administrator. In an embodiment, the new categorization rules are automatically evaluated by the machine learning test error categorization engine 118 over a period of time by determining what effect the new categorization rules would have by executing them in a shadow execution mode (e.g., running them without allowing them to effect the categorization at that time) and then comparing these shadow predictions to closed defect tickets.

Figure 3:
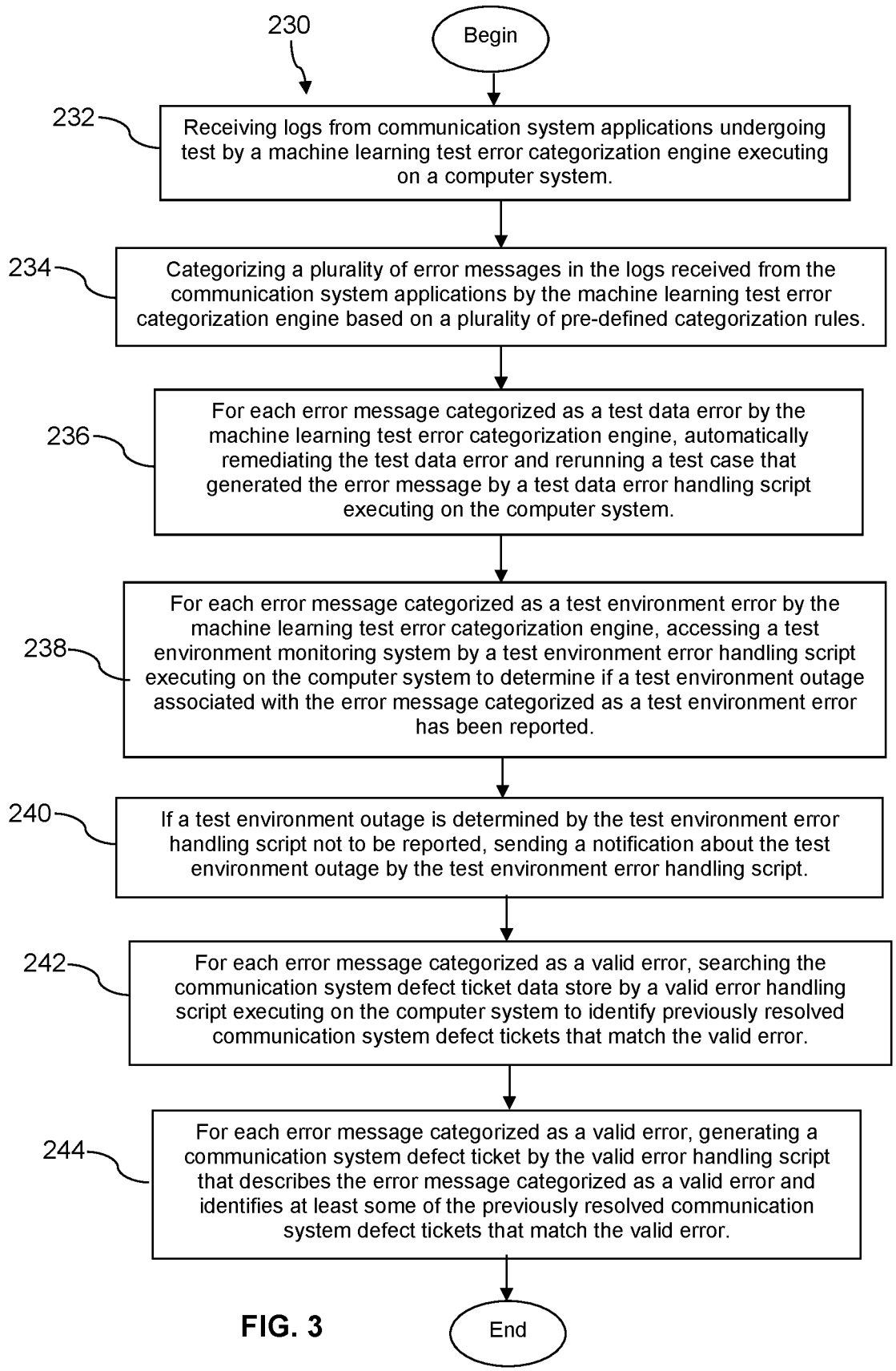
FIG. 3 is a flow chart of another method according to an embodiment of the disclosure.

Turning now to FIG. 3, a method 230 is described. In an embodiment, the method 230 is a method of performing root cause analysis of communication system testing results and submitting communication system defect tickets along with associated previously resolved communication system defect tickets that provide insights for repairing the communication system defects. At block 232, the method 230 comprises receiving logs from communication system applications undergoing test by a machine learning test error categorization engine executing on a computer system. At block 234, the method 230 comprises categorizing a plurality of error messages in the logs received from the communication system applications by the machine learning test error categorization engine based on a plurality of pre-defined categorization rules.

At block 236, the method 230 comprises, for each error message categorized as a test data error by the machine learning test error categorization engine, automatically remediating the test data error and rerunning a test case that generated the error message by a test data error handling script executing on the computer system.

At block 238, the method 230 comprises, for each error message categorized as a test environment error by the machine learning test error categorization engine, accessing a test environment monitoring system by a test environment error handling script executing on the computer system to determine if a test environment outage associated with the error message categorized as a test environment error has been reported. At block 240, the method 230 comprises, if a test environment outage is determined by the test environment error handling script not to be reported, sending a notification about the test environment outage by the test environment error handling script.

At block 242, the method 230 comprises, for each error message categorized as a valid error, searching the communication system defect ticket data store by a valid error handling script executing on the computer system to identify previously resolved communication system defect tickets that match the valid error. At block 244, the method 230 comprises, for each error message categorized as a valid error, generating a communication system defect ticket by the valid error handling script that describes the error message categorized as a valid error and identifies at least some of the previously resolved communication system defect tickets that match the valid error.

Figure 4:
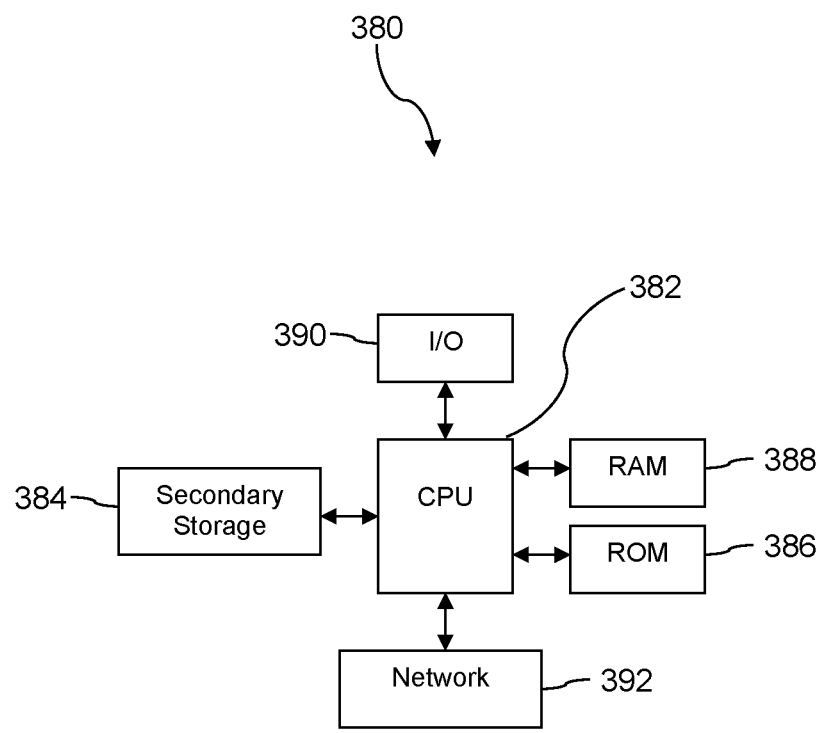
FIG. 4 is a block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of performing root cause analysis of communication system testing results, submitting communication system defect tickets along with associated previously resolved communication system defect tickets that provide insights for repairing the communication system defects, and analyzing previously resolved communication system defect tickets to update a machine learning test error categorization engine, comprising:
receiving logs from communication system applications undergoing test by a machine learning test error categorization engine executing on a computer system;
categorizing a plurality of error messages in the logs received from the communication system applications by the machine learning test error categorization engine based on a plurality of pre-defined categorization rules, wherein each of the plurality of error messages is categorized as a test data error, a test environment error, a test case error, or a valid error;
for each error message categorized as a test data error by the machine learning test error categorization engine, automatically remediating the test data error and rerunning a test case that generated the error message by a test data error handling script executing on the computer system;
for each error message categorized as a test environment error by the machine learning test error categorization engine, accessing a test environment monitoring system by a test environment error handling script executing on the computer system to determine if a test environment outage associated with the error message categorized as a test environment error has been reported;
if a test environment outage associated with the error message categorized as a test environment error by the machine learning test error categorization engine has not been reported, sending a notification about the outage associated with the test environment by the test environment error handling script;
if a test environment outage associated with the error message categorized as a test environment error by the machine learning test error categorization engine has been reported, sending a notification to a tester about the reported test environment outage by the test environment error handling script;
for each error message categorized as a test case error by the machine learning test error categorization engine, searching a communication system defect ticket data store by a test case error handling script executing on the computer system to identify previously resolved communication system defect tickets that match the test case error;
for each error message categorized as a test case error by the machine learning test error categorization engine, sending a notification to a tester by the test case error handling script indicating the error message was categorized as a test case error and identifying the previously resolved communication system defect tickets found to match the test case error;
for each error message categorized as a valid error by the machine learning test error categorization engine, searching the communication system defect ticket data store by a valid error handling script executing on the computer system to identify previously resolved communication system defect tickets that match the valid error;
for each error message categorized as a valid error by the machine learning test error categorization engine, generating a communication system defect ticket by the valid error handling script that describes the error message categorized as a valid error and identifies at least some of the previously resolved communication system defect tickets that match the valid error;
analyzing the previously resolved communication system defects by the machine learning test error categorization engine;
synthesizing new categorization rules by the machine learning test error categorization engine based on analyzing the previously resolved communication system defects; and
training the machine learning test error categorization engine according to the new categorization rules to enable the machine learning test error categorization engine to categorize subsequent error messages according to the new categorization rules.

2. The method of claim 1, wherein the machine learning test error categorization engine receives the logs from the communication system applications indirectly via an application log monitor.

3. The method of claim 1, wherein remediating the test data error comprises loading test data.

4. The method of claim 1, wherein remediating the test data error comprises getting appropriate test data from a test data management (TDM) system and loading the retrieved test data.

5. The method of claim 1, wherein the notification about the test environment outage is sent as an email or as a text message to an administrator or to a group address responsible for maintaining the test environment.

6. The method of claim 1, wherein the notification about the test environment outage is provided via an application programming interface (API) of an environment monitor.

7. The method of claim 1, further comprising the test environment error handling script determining when the test environment outage is resolved and sending a notification to a tester to rerun the test case.

8. A system to perform root cause analysis of communication system testing results and to automatically submit communication system defect tickets along with associated previously resolved communication system defect tickets that provide insights for repairing the communication system defects, comprising:
a processor;
a data store comprising a plurality of resolved communication system defect tickets;
a non-transitory memory;
a machine learning test error categorization engine stored in the non-transitory memory that, when executed by the processor:
receives logs from communication system applications undergoing test and categorizes a plurality of error messages in the logs based on a plurality of pre-defined categorization rules;
analyzes previously resolved communication system defects;
synthesizes new categorization rules based on analyzing the previously resolved communication system defects; and
trains the machine learning test error categorization engine according to the new categorization rules to enable the machine learning test error categorization engine to categorize subsequent error messages according to the new categorization rules;

a test data error handling script stored in the non-transitory memory that, when executed by the processor, for each error message categorized by the machine learning test error categorization engine as a test data error, automatically remediates the test data error and reruns a test case that generated the error message;

a test environment error handling script stored in the non-transitory memory that, when executed by the processor, for each error message categorized by the machine learning test error categorization engine as a test environment error, accesses a test environment monitoring system to determine if a test environment outage associated with the error message categorized as a test environment error has been reported and sends a notification about the test environment outage if the test environment outage is determined to not be reported; and a valid error handling script stored in the non-transitory memory that, when executed by the processor,
for each error message categorized by the machine learning test error categorization engine as a valid error, searches the data store to identify previously resolved communication system defect tickets that match the valid error, and
for each error message categorized as a valid error by the machine learning test error categorization engine, generating a communication system defect ticket by the valid error handling script that describes the error message categorized as a valid error and identifies at least some of the previously resolved communication system defect tickets that match the valid error.

9. The system of claim 8, wherein each of the plurality of error messages is categorized by the machine learning test error categorization engine as a test data error, a test environment error, a test case error, or a valid error.

10. The system of claim 9, further comprising a test case error handling script stored in the non-transitory memory that, when executed by the processor, for each error message categorized as a test case error sends a notification to a tester about the error message categorized as a test case error, whereby the tester is enabled to correct a test case error.

11. The system of claim 10, wherein the test case error handling script, for each error message categorized as a test case error searches the data store to identify resolved communication system defect tickets that match the test case error and attaches information about the matching resolved communication system defect tickets to the notification it sends to the tester.

12. The system of claim 8, wherein the machine learning test error categorization engine analyzes resolved communication system defect tickets in the data store, generates new categorization rules, and adds the new categorization rules to the pre-defined categorization rules.

13. The system of claim 8, wherein the test environment error handling script further monitors a status of the test environment outage to determine when the outage is resolved and, responsive to such resolution, automatically re-queues a test case that generated the test environment error for execution by the system.

14. The system of claim 8, wherein the test data error handling script remediates some of the test data errors by loading data into an automated test system.

15. The system of claim 8, wherein the test data error handling script remediates some of the test data errors by looking up test data in a test data management (TDM) system and loading looked up test data into an automated test system.

16. A method of performing root cause analysis of communication system testing results and submitting communication system defect tickets along with associated previously resolved communication system defect tickets that provide insights for repairing the communication system defects, comprising:
receiving logs from communication system applications undergoing test by a machine learning test error categorization engine executing on a computer system;
categorizing a plurality of error messages in the logs received from the communication system applications by the machine learning test error categorization engine based on a plurality of pre-defined categorization rules;
for each error message categorized as a test data error by the machine learning test error categorization engine, automatically remediating the test data error and rerunning a test case that generated the error message by a test data error handling script executing on the computer system;
for each error message categorized as a test environment error by the machine learning test error categorization engine, accessing a test environment monitoring system by a test environment error handling script executing on the computer system to determine if a test environment outage associated with the error message categorized as a test environment error has been reported;
if a test environment outage is determined by the test environment error handling script not to be reported, sending a notification about the test environment outage by the test environment error handling script;
for each error message categorized as a valid error, searching the communication system defect ticket data store by a valid error handling script executing on the computer system to identify previously resolved communication system defect tickets that match the valid error;
for each error message categorized as a valid error, generating a communication system defect ticket by the valid error handling script that describes the error message categorized as a valid error and identifies at least some of the previously resolved communication system defect tickets that match the valid error;
analyzing the previously resolved communication system defects by the machine learning test error categorization engine;
synthesizing new categorization rules by the machine learning test error categorization engine based on analyzing the previously resolved communication system defects; and
training the machine learning test error categorization engine according to the new categorization rules to enable the machine learning test error categorization engine to categorize subsequent error messages according to the new categorization rules.

17. The method of claim 16, wherein the machine learning test error categorization engine analyzes resolved communication system defect tickets read from a data store, generates new categorization rules based on the analysis, and adds the new categorization rules to the pre-defined categorization rules.

18. The method of claim 17, wherein the machine learning test error categorization engine analyzes fields of the resolved communication system defect tickets comprising a defect summary field, an application identity, a finding field, an action taken field, and a closing category field.

19. The method of claim 18, wherein the machine learning test error categorization engine generates the new categorization rules further based on fields of the error messages comprising an application under test identity field and a cause of failure field.

20. The method of claim 16, further comprising:
for each error message categorized as a test case error by the machine learning test error categorization engine, searching the communication system defect ticket data store by a test case error handling script executing on the computer system to identify previously resolved communication system defect tickets that match the test case error; and
for each error message categorized as a test case error by the machine learning test error categorization engine, sending a notification to a tester by the test case error handling script indicating the error message was categorized as a test case error and identifying the previously resolved communication system defect tickets found to match the test case error.

* * * * *